United States Patent [19]

Maruyama

[11] Patent Number: 4,681,725

[45] Date of Patent: Jul. 21, 1987

[54] INJECTION SKIS AND THEIR PROCESS OF MANUFACTURE

[75] Inventor: Tetsuzo Maruyama, Liyama, Japan

[73] Assignee: Kabushiki Kaisha Swallow Ski, Nagano, Japan

[21] Appl. No.: 774,366

[22] Filed: Sep. 10, 1985

Related U.S. Application Data

[62] Division of Ser. No. 662,787, Oct. 19, 1984, abandoned.

[30] Foreign Application Priority Data

| Oct. 21, 1983 | [JP] | Japan | 58-197895 |
| Mar. 29, 1984 | [JP] | Japan | 59-062638 |
| Apr. 5, 1984 | [JP] | Japan | 59-068302 |
| Apr. 11, 1984 | [JP] | Japan | 59-073627 |

[51] Int. Cl.⁴ .......................... A63C 5/00; A63C 5/04; A63C 5/12
[52] U.S. Cl. .................. 264/46.5; 264/46.6; 280/610
[58] Field of Search ...................... 264/255, 46.5, 46.6; 280/610

[56] References Cited

U.S. PATENT DOCUMENTS

| 2,071,220 | 2/1937 | Schniebs | 280/609 |
| 2,510,794 | 6/1950 | Beerli | 280/609 |
| 3,212,787 | 10/1965 | Wernty | 280/609 |
| 3,534,972 | 10/1970 | Salerno | 280/609 |
| 3,733,380 | 5/1973 | Ishida | 280/610 X |
| 3,816,573 | 6/1974 | Hashimoto et al. | 264/46.5 |
| 3,958,810 | 5/1976 | Böhm | 264/46.5 X |
| 4,118,051 | 10/1978 | Shima | 280/610 |
| 4,154,459 | 5/1979 | Kneissl | 280/610 |
| 4,340,241 | 7/1982 | Crocket | 280/609 |

FOREIGN PATENT DOCUMENTS

| 2704858 | 8/1978 | Fed. Rep. of Germany | 280/609 |
| 733250 | 10/1932 | France | 280/610 |
| 2523460 | 9/1983 | France | 280/610 |
| 0006239 | 1/1977 | Japan | 280/610 |
| 408734 | 9/1966 | Switzerland | 280/609 |

OTHER PUBLICATIONS

EP Application 0078521 of May 1983, Viola.

Primary Examiner—Nancy A. Swisher
Attorney, Agent, or Firm—Birch, Stewart, Kolasch & Birch

[57] ABSTRACT

Ski upper- and lower-surface constituting materials are set in position in a mold provided with a space appropriate for the dimensional distribution of the padding for the ski. The ski upper-surface constituting material is arranged so that a resin sheet of ABS resin, etc. constitutes the outer surface of ski. The inner upper surface of the upper mold piece is formed in a curved surface having, for example, grooves. A foamy resin is injected to fill the space between the ski upper and lower constituting materials. The foaming pressure raised by the foamy resin will press the resin sheet against the inner upper surface of the upper mold piece with resulting deformation of the resin sheet. Thus one may obtain a ski which is provided on its upper surface with projections.

7 Claims, 29 Drawing Figures

INJECTION SKIS AND THEIR PROCESS OF MANUFACTURE

This application is a divisional of copending application Ser. No. 662,787, filed on Oct. 19, 1984.

DESCRIPTION OF THE PRIOR ART

Recently, new materials such as glass fiber and carbon fiber have come to be adopted as structural materials for skis, resulting in remarkable promotion of the performance of skis and changes in the process and technology of ski manufacture. In particular, the development of foamy resins such as urethane foam as a padding material for skis has given birth to the injection ski for which such a foamy resin is injected.

Conventionally, the skis using the above-mentioned new materials have been in multi-laminated structure with the upper surfaces made flat. Such a structure with a flat upper surface has been thought to be advantageous for the manufacture on the above-mentioned multi-laminated structure and capable of providing sufficient strength for products.

However, with respect to skis used for ski match or adequate for advanced skiers, there has been a desire for improvement in such performances as turning manageability, high-speed stability, and edge efficiency. The performance of a ski depends highly on the entire shape of ski and accordingly, the above-mentioned restriction of ski structure to flat surface is taken to set a barrier on the improvement of ski since, under that restriction, adjustments on ski are available only on the internal structure, side curve, and so on.

The present invention, contrary to the conventional general recognition, has succeeded in promoting the performance of skis by providing the ski surface with projections of mountain shape, etc.

Provisions of mountain-shaped projections on the upper surface of ski was adopted with an old single-board wooden ski, but this provision was intended merely for increasing the breaking strength and could be obtained very easily by planing the wooden board material. In contrast, it is very difficult to apply such a provision of mountain-shaped projections to a multi-layered ski using new materials. Suppose that wooden chips, etc. are glued on a flat upper surface of a conventional ski to form mountain-shaped projections. Such a process is complicated and will inevitably raise the cost and on the other hand, glued wooden chips are likely to be detached when a twisting stress is concentrated on them.

SUMMARY OF THE INVENTION

The object of the present invention is to offer a novel process which utilizes the foaming pressure of a foamy resin to bring the ski upper-surface constituting material and/or the ski lower-surface constituting material into pressurized contact with the inner surface of a mold, with a resulting deformation of the ski upper-surface constituting material and/or the ski lower-surface constituting material along the shape of the inner surface of the mold, and which is capable of producing at low cost injection skis having arbitrary surface shapes and allowing ski design with increased freedom.

A further object of the present invention is to offer a novel injection ski which is characterized in that the upper-surface is provided with a rib structure consisting of projections or dents, the ski mass distribution is dense toward the center of gravity, the ski is excellent in bending elasticity, torsional elasticity, and breaking strength, the swing weight is light, the ski maneuverability is excellent, and that the stability during high-speed sliding is secured.

A still further object of the present invention is to offer a novel injection ski which is characterized in that the groove on the slide surface may easily be formed, and that a thin-thickness resin sheet may be used as the slide surface material with resulting cost reduction.

BRIEF DESCRIPTION OF THE DRAWINGS

and FIGS. 27-29 illustrate other examples of manufacturing processes, in which

DETAILED DESCRIPTION OF THE INVENTION

The preferred embodiment of the present invention will be explained in detail with reference to the accompanying drawings.

Figure 1:
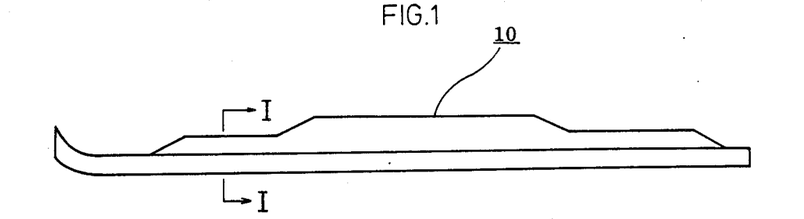
FIG. 1 is a side-view for an example of injection ski relating to the present invention.
Figure 2:
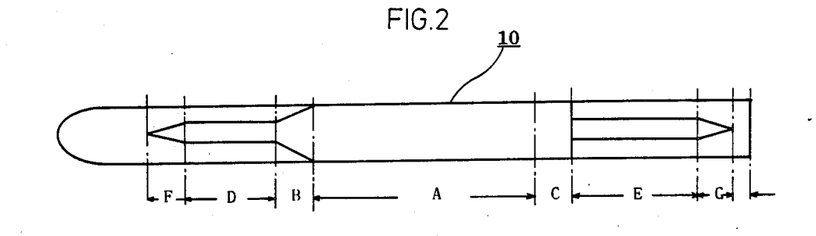
FIG. 2 is a top plan view in relation to FIG. 1.
Figure 3:
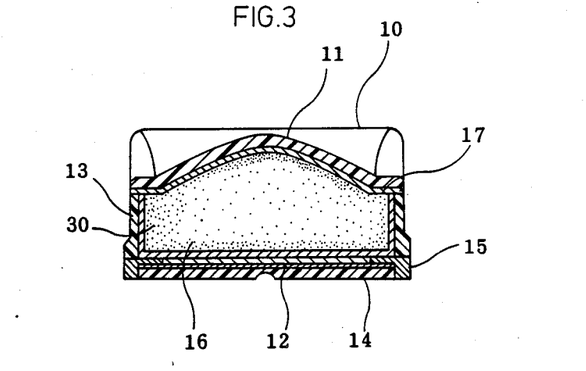
FIG. 3 is the I—I sectional view for FIG. 1.

FIGS. 1 and 2 show the side-view and plan, respectively, of an example of injection ski based on the present invention. FIG. 3 shows the I—I section for FIG. 1. For FIGS. 1-3 and all the following figures, note that, for brevity, the bend of ski is omitted so that the upper surface of a conventional ski is flat and that the thickness of a conventional ski is uniform. Referring to FIG. 3, a hollow ski frame 10 is constructed with an ABS resin sheet 11, a lower-surface reinforcing material 12, a side reinforcing material 13, and a plastic slide-surface material 14 placed under the lower-surface reinforcing material 12. A metallic edge piece 15 is inserted and fixed between the lower-surface reinforcing material 12 and the side reinforcing material 13. A foamy resin 16 such as urethane foam is injected and solidified as a padding material within the ski frame. An inside reinforcing material 17 of glass cloth, etc. is made to adhere on the inside surface of the ski frame by means of the foamy resin 16. As seen from the above structure, the ABS resin sheet 11, the inside reinforcing material, etc. form the ski upper-surface constituting material, and on the other hand, the slide-surface material 14, the lower-surface reinforcing material 12, the inside reinforcing material 17, etc. form the ski lower-surface constituting material.

The feature of the above-described example lies in that the upper surface of ski 10 is formed flat over the holder-attaching section in the middle thick part of the ski frame, which extends out, toward the tip and tail of ski, steps with gradually decreasing height, and that the step extending out toward the tail has a cross-section of a mountain-shaped projected form. As is clear from FIG. 3, the structure of this projection is such that the ABS resin sheet 11 as the upper-surface material is bent to have a mountain-shaped cross-section, the inside reinforcing material 17, of glass cloth, etc., is bent in intimate contact with the ABS resin sheet 11, and that the foamy resin 16, of urethane foam, etc., is filled in the above-mentioned partially-expanded space.

Figure 4:
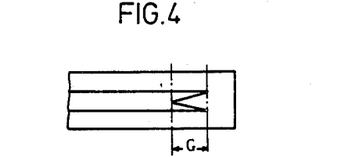
FIG. 4 is a top plan view for another example of projection to be adopted for the tail section.

The thickness of the mountain-shaped projection will be detailed below for a 180-cm ski as an example (cf. FIGS. 1 and 2); the term thickness used here is defined as the height from the upper surface of conventional ski. Referring to FIGS. 1 and 2, the holder-attaching section A in the middle of the ski frame is about 55 cm long and about 5 mm in thickness, its upper surface being flat; its edge part may be rounded slightly. The tip-side section B and the tail-side section C, both adjacent to the above-described section A, are each about 9 cm long, decreasing in height gradually toward their respective ends down to 2.5 mm. The section D adjacent to the section B is 34 cm long and kept 2.5 mm in thickness and similarly, the section E adjacent to the section C is 25 cm long and kept 2.5 mm in thickness. The sections F and G, adjacent to the sections D and E, respectively, are 9 cm long, decreasing in thickness gradually from 2.5 to 0 mm. The widths of sections D, E, F, and G, as seen from FIG. 2, are narrower than the ski width; actually, however, the widths of these sections may be the same as the ski width. The section G, as shown in FIG. 4, may be made bifurcated. Such bifurcation serves to increase the torsional elesticity of the tail section.

Figure 5:
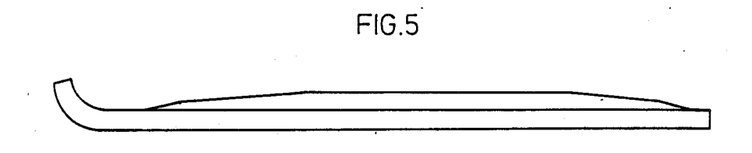
FIGS. 5 and 6 are side-views for other examples of projections.
Figure 6:
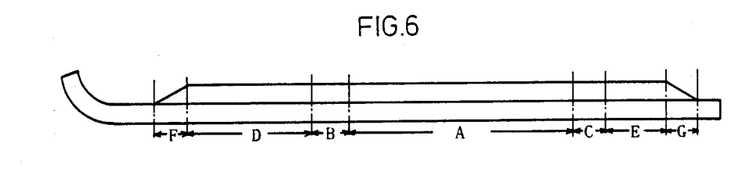

The shapes of the projections are not restricted to the above-described, but as shown in FIG. 5, the thickness may be continuously decreased toward the ski tip or tail from the holder-attaching section in the middle of the ski frame, or may be kept constant over sections A, B, C, D, and E, as shown in FIG. 6. In these examples of embodiment, the projections are formed so that the mass distribution of the ski becomes denser toward the center of gravity.

Figure 7:
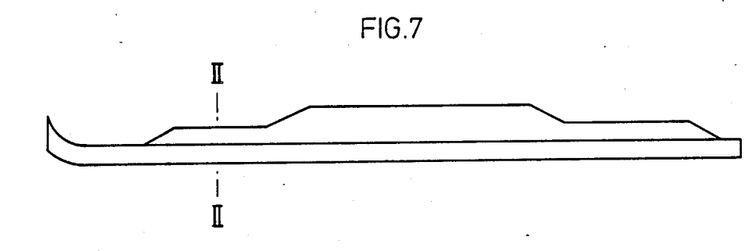
FIG. 7 is a side-view for another example of projection.
Figure 8:
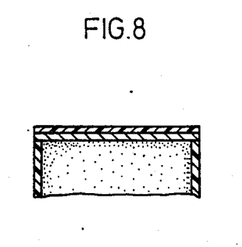
FIGS. 8-10 are II—II partial sectional views for other examples of projections, the II—II position being specified in FIG. 7.
Figure 9:
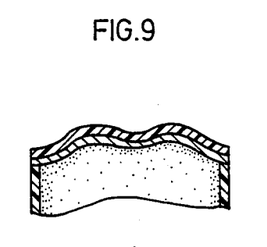
Figure 10:
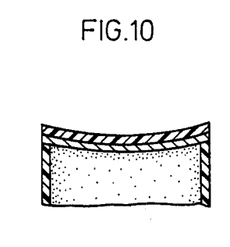

Other examples of embodiments are indicated by FIGS. 8, 9, and 10 which show cross sections corresponding to the II—II section in FIG. 7.

The projection of FIG. 8, with a flat upper-surface, is so formed as to cover the full ski width. Even such an example of embodiment is featured by light swing-weight and improved maneuverability.

The projection of FIG. 9 is in a form of twin-peak mountains, which is effective for increasing the breaking strength.

The projection of FIG. 10, with a concave upper-surface, is so formed as to cover the full ski width. This concave shape is effective for preventing crossing of right and left skis from leaving scratches on the ski upper-surfaces.

All of the projections shown in FIGS. 8 to 10 have the holder-attaching sections formed flat in their upper-surfaces.

Figure 11:
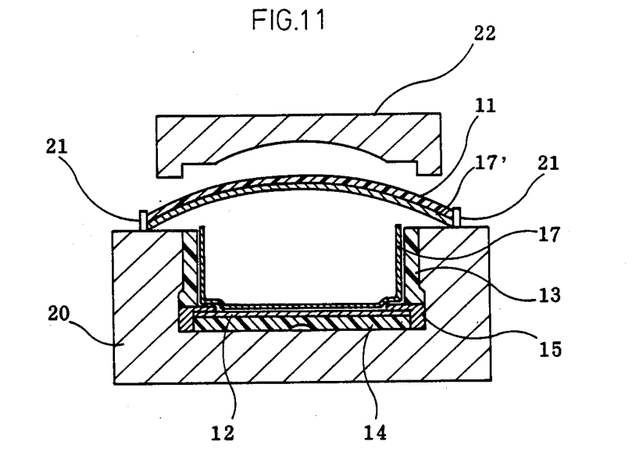
FIG. 11 shows a sectional view for an example of mold available.

The process of manufacture will be explained below with reference to FIG. 11.

First, into the lower mold piece are placed in position the slide-surface material 14, lower-surface reinforcing material 12, metallic edge pieces 15, and side reinforcing material 13. Next, an inside reinforcing material 17, e.g., a glass cloth bent in a U-shape, is inserted from the open section into the internal space provided with the above-mentioned materials. Then, a laminated combination of the ABS resin sheet 11 and the upper portion 17' of the inside reinforcing material 17 is set between the four pins 21 (only two of them shown in the figure) so as to be bent upward convex covering the open section of the lower mold piece 20. Finally, an upper mold piece 22, which has had its inner surface formed in a concave surface appropriate for the intended projection, is placed from above the lower mold piece. After the setting, with the upper mold piece 22 kept under uniform pressure by use of air bags (not shown), etc., a foamy resin such as urethane foam is injected and solidified within the mold. During this process, the heat evolved as the foamy resin is allowed to foam will soften the ABS resin sheet 11 and simultaneously the foaming pressure will press the ABS resin sheet 11, together with the flexible upper portion 17' of the inside reinforcing material 17, against the concave inner surface of the upper mold piece 22 until the projected structure of desired ski upper-surface has been obtained. As to the material setting, the combined ABS resin sheet 11 and the upper portion 17' may have only to be set so as to cover the open section of lower mold piece 20, without being made bent by the pins 21 as described above; even in such a case, the foaming pressure of the foamy resin is able to complete the pressing against the inner concave surface of upper mold piece 22. Note that in the absence of pins 21 the foaming pressure will cause the deformation more rapidly than in the presence of pins 21, often resulting in positional deviation.

The molding process will produce fins from the ABS sheet 11 and the upper portion 17'. To complete the manufacturing process, these fins are to be removed by grinding and if necessary, painting, printing, etc. are to be applied on the upper surface of ski.

Figure 12:
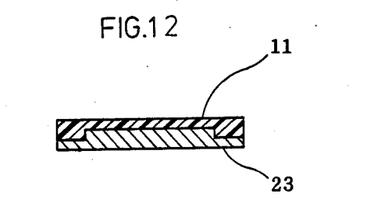
FIGS. 12-14 show sectional views for other examples of upper-surface constituting materials.
Figure 13:
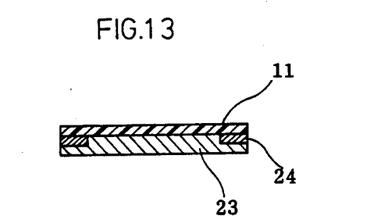
Figure 14:
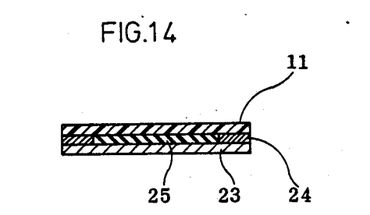
Figure 15:
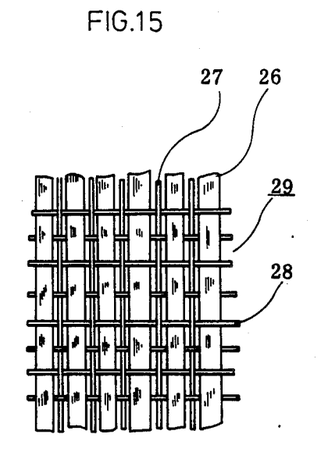
FIG. 15 illustrates another example of inside reinforcing material.
Figure 16:
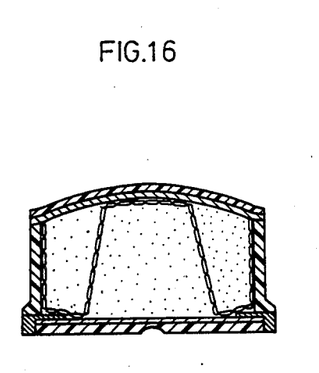
FIG. 16 shows a sectional view for a ski using the inside reinforcing material of FIG. 15.

Besides the above-mentioned combination of the ABS resin sheet 11 and the inside reinforcing material 17 of glass cloth, etc., as the upper-surface constituting material may be used the ABS resin sheet only, the combination, as shown in FIG. 12, of an ABS resin sheet 11 with a dent and a glass cloth 23 incorporated in the dent, the combination, as shown in FIG. 13, of an ABS resin sheet 11, aluminum top edges 24, and a glass cloth 23, or the combination, as shown in FIG. 14, an ABS resin sheet 11, aluminum top edges 24, a glass cloth 23, and a rubber sheet 25. For any of the above-given upper-surface constituting materials, it has been confirmed that the foaming pressure raised by the foamy resin is able to bring the upper-surface constituting material into intimate contact with the inner concave surface of the upper mold piece 22 to provide the desired projected structure. The ABS resin sheet 11 may be replaced by an epoxy resin sheet. As the inside reinforcing material a network structure may suitably be used for which, as shown in FIG. 15, glass fiber tapes 26 previously impregated with epoxy resin, etc. are placed parallel at constant intervals, nylon threads 27 are placed inbetween these intervals, and wires 28 are inserted perpendicularly to the glass fiber tapes to constitute a network. This inside reinforcing material 29 thus obtained contains so large network gaps as to allow the foamy resin to spread over into the gaps and bridge the components with resulting fast fixation. This inside reinforcing material 29 may be placed not only in contact with the inner surface of the ski frame but also at any positions within the foamy resin by suitably bending the network wires as shown in FIG. 16, thus being effective for enlarging the freedom in designing the ski strength, etc.

The condition for injectin of the foamy resin may be the same as the conventional one; without increasing the foaming ratio, the foaming pressure is capable of bringing the upper-surface constituting material into tight contact with the inner concave surface of the upper mold piece 22.

It has been established that for ordinary skis $\rho =$ ca. 0.6 is preferable in respect of the ski breaking strength where $\rho$ is the density of foamy resin after foaming (average density over within the ski frame). With the present invention, sufficiently tight contact of the upper-surface constituting material with the inner concave surface of upper mold piece 22 may be obtained by the foaming pressure when a foamy resin with free blow ca. 0.1 (foaming ratio ca. 10) is injected in a quantity corresponding to $\rho =$ ca. 0.6. In an experiment where a foamy resin with free blow ca. 0.1 was injected in a quantity corresponding to $\rho =$ ca. 0.4, the raised foaming pressure was strong enough to bring the upper-surface constituting material into tight contact with the inner concave surface of the upper mold piece 22. Such cases will result in slight decrease in ski strength, which may be compensated for by using the above described network as the inside reinforcing material.

It has been experimentally found that even a foamy resin with a foaming ratio as low as free blow ca. 0.2 is capable of complete pressing of the upper-surface constituting material.

Since the ski of the present invention is the injection ski using foamy resin, the foamy resin near the inner surface of ski frame is at a suppressed foaming ratio, forming a high-density skin layer 30 (cf. FIG. 3). This skin layer 30, on the side of ski upper-surface, forms a projected structure of mountain shape, etc. along the upper-surface constituting material and thus, in conjunction with the projected structure of the upper-surface constituting material, increases the strength of the entire ski.

The vibration of ski in sliding is absorbed by the foamy resin to a high ratio. In the case of products of the present invention specifying a projected structure of mountain shape, etc. to the upper side of the foamy resin, an effect of suppressing the ski vibration from above the ski upper surface will work with resulting promoted vibrational decay and increased high-speed stability. Furthermore, the upper side of ski has a form of trapezoid with a higher portion in the longitudinal middle and thus the ski mass is made concentrated to the side of the center of gravity with reduced moment of inertia and greatly promoted ski maneuverability.

A comparative list of properties of skis is given below.

|  | Trial product 1 | Trial product 2 | Conventional product |
| --- | --- | --- | --- |
| Moment of inertia kg · m² | 0.3154 | 0.3183 | 0.3579 |
| Breaking load kg | 730 | 715 | 695 |
| Bending vibration |  |  |  |
| Half-life sec | 1.46 | 2.36 | 2.54 |
| Vibrational frequency sec | 0.073 | 0.076 | 0.085 |
| Natural frequency Hz | 13.76 | 14.08 | 13.78 |

Figure 17:
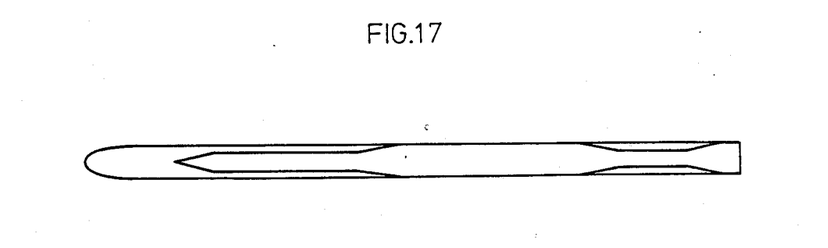
FIGS. 17 and 18 show plans for the skis subjected to the performance test whose results are given in the specification.
Figure 18:
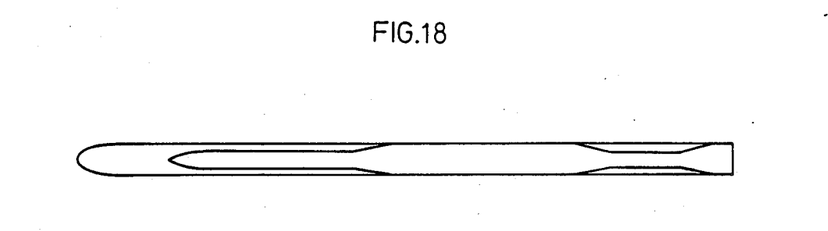

The trial products 1 and 2 have the structures shown in FIGS. 17 and 18, respectively.

Figure 19:
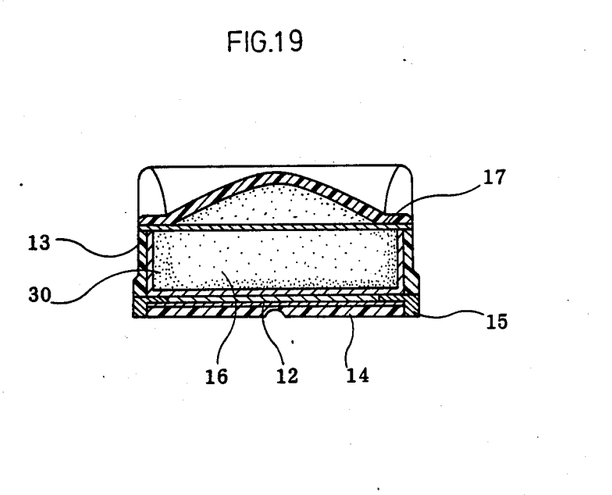
FIG. 19 shows a sectional view for another example of embodiment.

The present invention may adopt such an inside refinforcing material 17 as has a relatively high strength so as not to be deformed by the foaming pressure of foamy resin. In using such materials, as shown in FIG. 19, the inside reinforcing material 17 has through-holes (not shown) provided and the foamy resin is allowed to pass through the through-holes to deform only the resin sheet 11.

Figure 20:
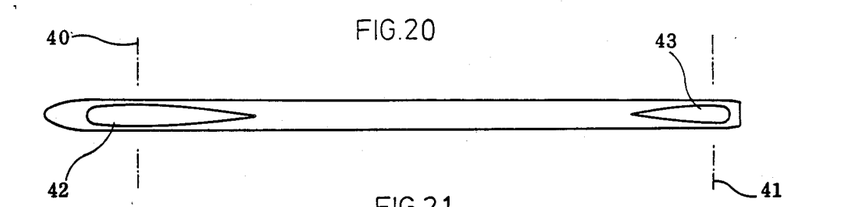
FIG. 20 shows a plan for another example of embodiment.
Figure 21:
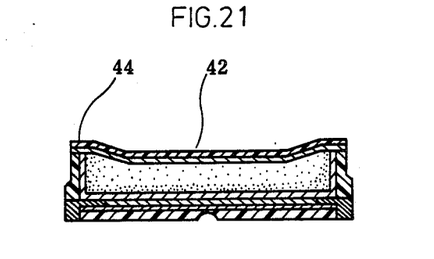
FIG. 21 shows a cross-section view taken at the landing line for the example of FIG. 20.
Figure 22:
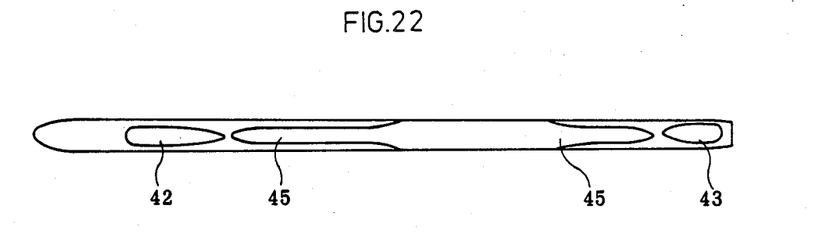
FIG. 22 shows a plan for an application example from the example of FIG. 20.

FIGS. 20-22 show other examples of embodiments.

In the example of FIG. 20, on the upper surface of ski there are provided streamline-shaped dents 42 and 43 in such a manner that they cover the tip-side landing line 40 and the tail-side landing line 41, respectively, on the ski side surface. These dents 42 and 43 are formed, as shown by the section in FIG. 21, by causing an ABS resin sheet 44 to be dented to a depth of about 2 mm. To form the dents 42 and 43, projections are provided at the corresponding positions on the inner upper-surface of upper mold piece and allowing the foaming pressure raised during the molding process to bring the ABS resin sheet 44 previously disposed in the mold into pressurized contact with the above-mentioned projections with resulting deformation. Either one of the dents 42 and 43 may be omitted according to ski design.

This example of embodiment may permit free setting of the flexibilty of both the ski top and tail sections with the rigidity of the ski middle section kept unchanged, thus enabling us to design ideal skis with various required properties such as vibration absorbability taken into consideration.

In the example of FIG. 22, dents 42 and 43 are provided on the ski upper-surface so as to cover the landing lines at the ski tip and tail sides, respectively, and on the ski upper-surface in the middle section with a mountain-shaped projection 45 as already described. This structure permits free setting of the flexibility of both the tip and tail sections as well as the rigidity of the middle section of ski, thus increasing still the freedom of ski design.

Figure 23:
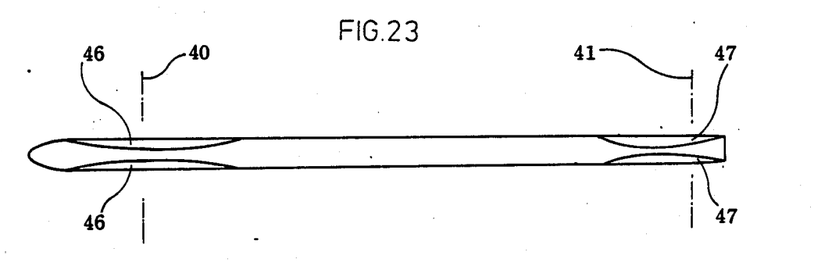
FIG. 23 shows a plan for another embodiment.
Figure 24:
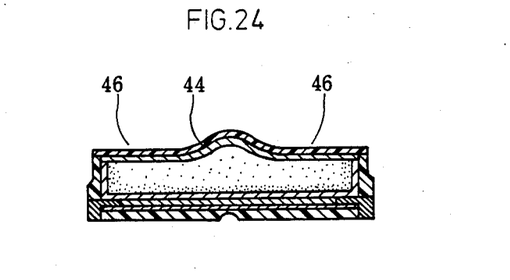
FIG. 24 shows a cross-sectional view taken at the landing line for the example of FIG. 23.
Figure 25:
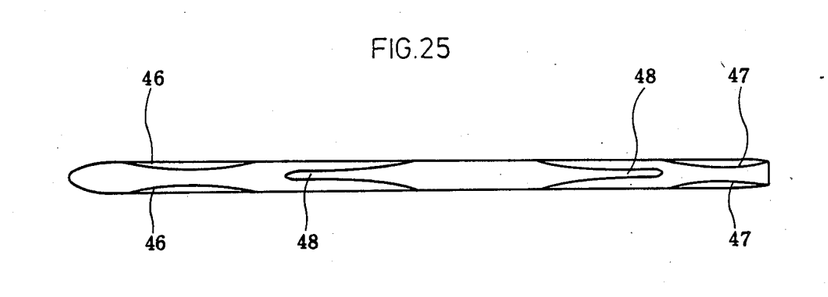
FIG. 25 shows a plan for an application example from the example of FIG. 23.

FIGS. 23–25 show further other examples of embodiment.

In the example of FIG. 23, thin-thickness dents 46 are provided at the tip section on the upper-surface of the ski so as to each cover the tip-side landing line 40 on the ski slide surface, and thin-thickness dents 47 are provided at the tail section on the upper-surface of ski so as to each cover the tail-side landing line 41 on the ski slide surface. The sectional shape of the dents 46 and 47 is shown in FIG. 24.

This example also permits free setting of the flexibility of both the tip and tail sections. The dents 46 and 47 may be formed by providing the upper mold piece with projections at the corresponding positions on its inner upper surface and causing the foaming pressure of foamy resin to bring the ABS resin sheet 44 into pressurized contact with the projections.

The example of FIG. 25 adopts both dents 46 and 47 and a mountain-shaped projection 48 in the ski middle section, which structure is as effective for increasing the freedom of ski design as the above-described.

Figure 26:
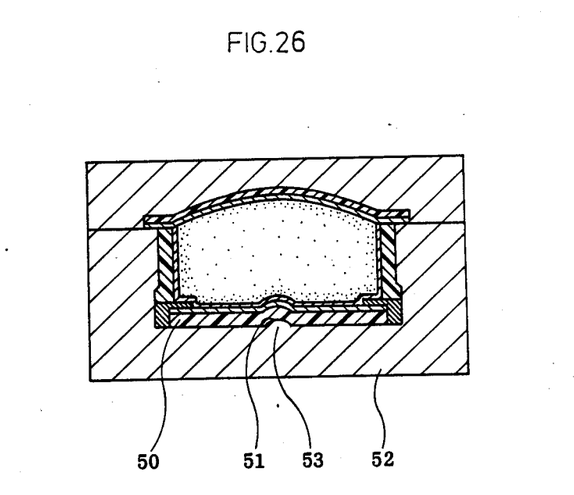
FIG. 26 shows a sectional view illustrating how to deform a slide surface material to form a groove.

FIG. 26 shows another example of embodiment.

In this example, a groove 51 on the slide surface material 50 is formed in the same was as already described. The lower mold piece 52 is provided on its inner bottom surface with a projected stripe 53 corresponding to the groove 51 intended to be formed. In the mold are set the slide surface material 50, the necessary reinforcing materials, metallic edge pieces, etc. and then a foamy resin is injected to fill the mold. The foaming pressure raised by the foamy resin will press the slide surface material 50 against the inner bottom surface of lower mold piece, causing a deformation of the slide surface material 50 along the projected stripe 53, with resulting formation of the groove 51.

According to this example, a groove 51 of any sectional forms may be formed with precise positioning simply by providing the inner bottom surface lower mold piece with a projected stripe 53 of prescribed form. This example is effective for remarkable cost reduction since it leads to decrease in the number of processing steps by eliminating the step of planing the slide surface material 50 as employed in the conventional process and since the slide surface material 50 may be reduced in thickness as compared with the conventional material.

Figure 27:
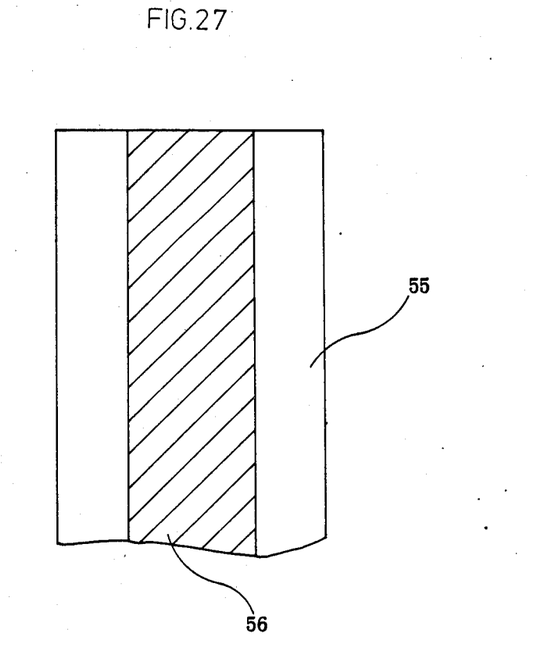
FIG. 27 shows a resin sheet for upper-surface constituting material which has previously been subjected to surface treatments such as printing, painting, etc.
Figure 28:
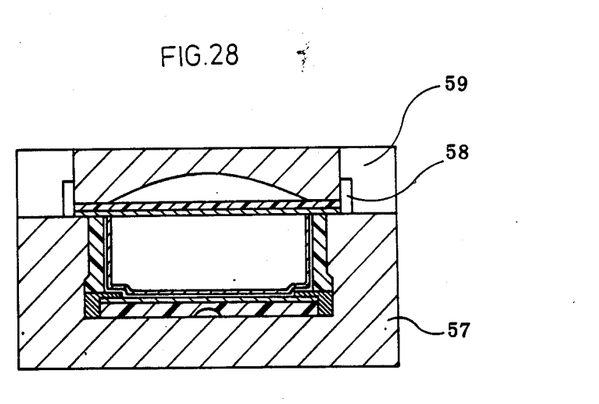
FIG. 28 shows a sectional view for the resin sheet set in a mold.
Figure 29:
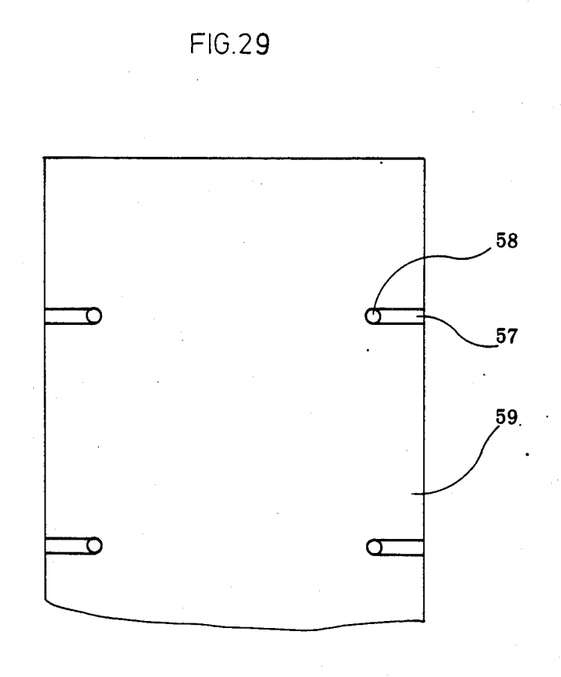
FIG. 29 shows a partially-omitted plan for a mold.

FIGS. 27–29 illustrate other examples of ski manufacturing processes.

In these examples, an ABS resin sheet 55 as the upper-surface material is previously subjected to necessary surface treatments such as printing and painting on its surface. A painted section is specified by reference numeral 56. The ABS resin sheet 55 with a surface treatment applied is set, as shown in FIG. 28, in position between several pieces of pins 58 suitably provided on the upper surface of lower mold piece 57, and upper mold piece 59 with the inner upper surface dented is put in position, and a foamy resin is injected into the mold. The foaming pressure raised by the foamy resin will bring the ABS resin sheet 55 into pressurized contact with the inner upper surface of upper mold piece 59 with resulting deformation of the ABS resin sheet and thus a ski having mountain-shaped projections on its upper surface may be obtained. This ski has already had its surface subjected to surface treatments such as printing and painting, so that there is no need for such a troublesome job as applying printings, etc. on curved surfaces of the mountain-shaped projections. FIG. 29 shows a plan of the mold used.

I claim:

1. A process for manufacturing injection skis, comprising the steps of:
   disposing a ski lower-surface constituting material comprising glide surface material in a lower mold;
   disposing a sheet-shaped ski upper-surface constituting material capable of being deformed by foaming pressure at a position spaced above said ski lower-surface constituting material to form a space between said ski lower-surface constituting material and said ski upper-surface constituting material;
   disposing an upper mold having an upward concave surface being equivalent to a mountain-shaped projection on the center of the upper surface of a complete ski on the upper side of said ski upper-surface constituting material and on top of said lower mold;
   injecting a foamy resin into said space between said ski upper and lower-surface constituting materials; and
   expanding said foamy resin to force said sheet-shaped ski upper-surface constituting material against said concave surface of said upper mold by the foaming pressure of said foamy resin and to form a mountain-shaped projection on the upper surface of the ski corresponding to said upward concave surface of said upper mold.

2. The manufacturing process according to claim 1, wherein the outer surface of said ski upper-surface constituting material at prescribed positions is subjected to printing or painting before being attached to said lower mold.

3. The manufacturing process according to claim 1, wherein said upper-surface constituting material comprises ABS resin.

4. A process for manufacturing injection skis, comprising the steps of:
   disposing a ski lower-surface constituting material comprising glide surface material in a lower mold;
   disposing a sheet-shaped ski upper-surface constituting material capable of being deformed by foaming pressure at a position spaced above said ski lower-surface constituting material to form a space between said ski lower-surface constituting material and said ski upper-surface constituting material;
   arranging said sheet-shaped ski upper-surface constituting material between pins arranged on opposite sides of the upper side of said lower mold to make said sheet-shaped ski upper-surface constituting material arc shallow upwardly;
   disposing an upper mold having an upward concave surface equivalent to a mountain-shaped projection on the center of a completed ski on the upper side of said ski upper-surface constituting material and on top of said lower mold;
   injecting a foamy resin into said space between said ski upper and lower-surface constituting materials; and
   expanding said foamy resin to force said sheet-shaped ski upper-surface constituting material against said concave surface of said upper mold by foaming pressure of said foaming resin wherein said ski upper-surface constituting material contacts said concave surface of said upper mold and a mountain-shaped projection is formed on the upper surface of the ski.

5. A manufacturing process according to claim 4, wherein notches are cut on opposite edges of said ski upper-surface constituting material and said ski upper-surface constituting material is arranged to make a shallow arc upwardly between said pins by fitting said pins in said notches.

6. A manufacturing process according to claim 4, wherein the outer surface of said ski upper-surface constituting material at prescribed positions is subjected to printing or painting before being attached to said lower mold.

7. A manufacturing process according to claim 4, wherein said upper-surface constituting material comprises ABS resin.

* * * * *